US008161100B1

(12) United States Patent
Lopez et al.

(10) Patent No.: US 8,161,100 B1
(45) Date of Patent: Apr. 17, 2012

(54) SELF-SERVICE PROVISIONING FOR MULTI-CHANNEL APPLICATIONS

(75) Inventors: Gustavo Eduardo Lopez, Seattle, WA (US); Andygibb Halim, Redmond, WA (US); Jason Aaron McMahon, Seattle, WA (US); Clifford A. Cancelosi, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 425 days.

(21) Appl. No.: 12/341,283

(22) Filed: Dec. 22, 2008

(51) Int. Cl.
*G06F 15/16* (2006.01)

(52) U.S. Cl. ........ 709/203; 709/238; 709/239; 709/217; 709/219; 726/2; 726/5

(58) Field of Classification Search .................. 709/203, 709/217, 219, 227, 228, 238, 239; 726/1, 726/2, 5; 705/42; 455/435.2; 379/227
See application file for complete search history.

(56) References Cited

U.S. PATENT DOCUMENTS

| 6,810,041 | B2* | 10/2004 | Walker et al. ................. 370/397 |
| 7,716,719 | B2* | 5/2010 | Kouznetsov et al. ............. 726/2 |
| 2002/0044567 | A1* | 4/2002 | Voit et al. ...................... 370/467 |
| 2002/0138431 | A1* | 9/2002 | Antonin et al. ................. 705/42 |
| 2005/0188370 | A1* | 8/2005 | Kouznetsov et al. .......... 717/174 |
| 2005/0289045 | A1* | 12/2005 | Lawson .......................... 705/38 |
| 2009/0061839 | A1* | 3/2009 | Zimmerman et al. ........ 455/419 |
| 2009/0156209 | A1* | 6/2009 | Franklin et al. ............. 455/435.2 |
| 2009/0158032 | A1* | 6/2009 | Costa et al. .................... 713/156 |
| 2010/0241711 | A1* | 9/2010 | Ansari et al. .................. 709/205 |

* cited by examiner

*Primary Examiner* — Frantz Jean
(74) *Attorney, Agent, or Firm* — Thomas, Kayden, Horstemeyer & Risley, LLP

(57) ABSTRACT

Disclosed are various embodiments for self-service provisioning of multi-channel applications. A self-service provisioning of a channel application is implemented on at least one server for a merchant based on channel configuration data supplied by a merchant client, at least a portion of the provisioning being performed automatically, the channel application being associated with a channel of commerce and becoming operable to facilitate a customer interaction for the merchant through the channel of commerce. There is communication with at least one channel client to perform the customer interaction according to merchant data stored on the at least one server.

30 Claims, 4 Drawing Sheets

SELF-SERVICE PROVISIONING FOR MULTI-CHANNEL APPLICATIONS

BACKGROUND

Products may be sold through different channels of commerce, such as through an online store, a brick-and-mortar store, a kiosk within a brick-and-mortar store, or order by telephone. Unfortunately, a merchant that uses only one channel of commerce with its existing infrastructure limits its sales. Additionally, a merchant that uses multiple channels of commerce without combining orders, customers, and selections across the channels incurs overhead and limits the functionality of its systems.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

A merchant may want to use additional channels of commerce to improve sales and provide more flexible methods of customer interaction. Examples of different channels of commerce include, but are not limited to, an online store, a brick-and-mortar store, a kiosk or computer system within a brick-and-mortar store, a mobile ordering system, a television set-top box, a telephone-based ordering system, a telephone-based customer service system, and other channels. For efficiency and other reasons, such a merchant may want to use a third-party provider of infrastructure facilitating such channels of commerce. It may be said that such a provider offers multi-channel applications. Described herein is a provisioning system for multi-channel applications that allows a merchant to provision and configure an instance of a channel application, with a portion or all of the tasks involved in provisioning and configuration being performed automatically, using data provided by the merchant and/or data previously stored in the system, both kinds of data potentially including configuration settings and other options as can be appreciated.

Figure 1:
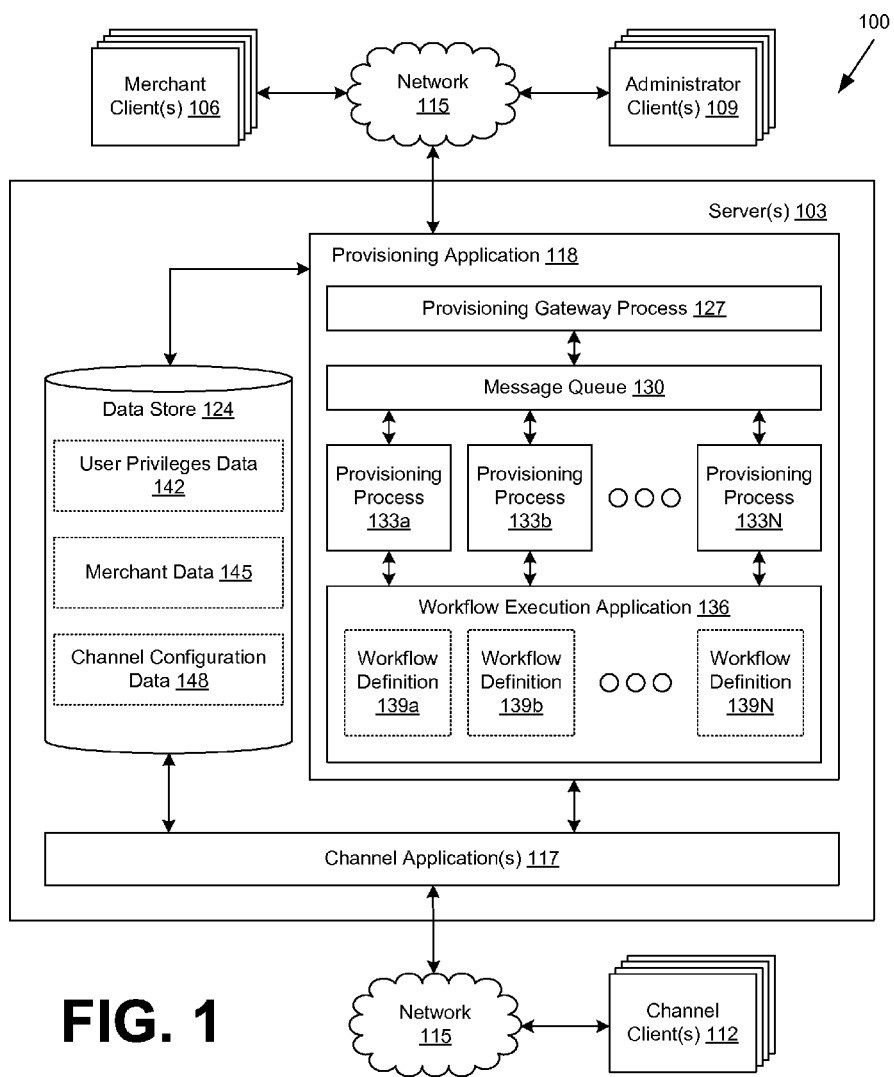
FIG. 1 is a drawing of a networked environment according to various embodiments of the present disclosure.

With reference to FIG. 1, shown is a networked environment 100 according to various embodiments. The networked environment 100 includes one or more servers 103 that are in data communication with one or more merchant clients 106, one or more administrator clients 109, and one or more channel clients 112. The one or more servers 103 are in data communication with the one or more merchant clients 106, the one or more administrator clients 109, and the one or more channel clients 112 via one or more networks 115. Each network 115 may comprise, for example, the Internet, intranets, extranets, wide area networks (WANs), local area networks (LANs), wired networks, wireless networks, or other suitable networks, etc., or any combination of two or more such networks. The networks 115 may also include one or more firewalls. Such firewalls may encompass the one or more administrator clients 109, the one or more servers 103, the one or more channel clients 112, and/or the one or more merchant clients 106, or any combination thereof as can be appreciated to provide security to the respective systems.

The one or more servers 103 may be arranged in a server bank or other appropriate configuration to handle requests from various clients such as the one or more merchant clients 106, the one or more administrator clients 109, or the one or more channel clients 112. To this end, each server 103 may comprise, for example, a server computer or other devices with like capability. Also, the one or more merchant clients 106, the one or more administrator clients 109, and the one or more channel clients 112 may comprise, for example, a desktop computer, a laptop computer, a personal digital assistant, a cellular telephone, or other devices with like capability. Each server 103 may, in some embodiments, execute a web server application or other comparable application. In such a case, each server 103 may communicate using hypertext transfer protocol (HTTP), secure HTTP, and/or simple object access protocol (SOAP) with one or more web browser applications, for example, executing on the one or more merchant clients 106, the one or more administrator clients 109, or the one or more channel clients 112. Such communication at the application layer may, for example, be expressed though extensible markup language (XML). Alternatively, other applications beyond browser applications and other protocols beyond the above protocols may be employed.

Next, a general discussion is provided about the concept of "channels of commerce" as this concept relates to the various embodiments. The one or more channel clients 112 facilitate various channels of commerce. As contemplated herein, a "channel of commerce" refers to a mode of commercial interaction between a merchant and customers. Different channels of commerce may employ different infrastructure for the distribution and sale of products.

A channel of commerce may involve the location of the customer and/or the merchant, the nature of the existence of the merchant, the way the customer interacts with the merchant, and other aspects. To illustrate, channels of commerce relating to customer interaction with respect to the placing of orders may include order by telephone, online storefront, a kiosk in a physical store, a mobile computing platform, a television set-top box, etc. Such channels of commerce relating to ordering may be termed order channels. In particular, a mobile computing platform may comprise automobile-based ordering systems, agent-assisted portable ordering devices, cellular telephones with ordering capability, handheld computers with ordering capability, etc. Channels of commerce relating to customer interaction with respect to the shipment of orders may include delivery to an address of the customer, delivery to a store for pickup by a customer, digital delivery by download, etc.

Channels of commerce also may involve a variety of tasks related to customer interactions, including order placement, payment, product pick-up, product return, notification, and other tasks. In some embodiments, one or more tasks may be regarded as a separate channel and/or be implemented by separate applications. Different channels of commerce may involve all, some, or none of same tasks.

Additionally, a channel of commerce may be associated with a marketplace, thereby allowing a merchant to offer its products or services alongside other merchants. A marketplace may have several advantages, including consistent interfaces for customer interactions for all merchants associated with the marketplace, ease of shopping for customers across multiple merchants, and potentially other advantages.

By allowing a merchant to provision multiple applications though one system in a self-service manner, with each application associated with a different channel of commerce, the applications may advantageously share common data. Therefore, multiple channels may process the same order during the lifetime of the order. As a nonlimiting example, a customer may select products via an online storefront application, pay for the same products via a telephone ordering application, and process a return for the same products via an in-store kiosk application.

A merchant may be associated with the one or more merchant clients 106. A merchant is an entity that may be involved with providing or selling goods, services, access to digital products, etc., to customers. A merchant may have a physical store, a chain of physical stores, physical warehouses, and/or some other type of physical presence. Also, a merchant may have one or more online stores and/or some other type of online presence. Further, a merchant may have no physical or online presence at all and may want to add either a physical or online presence.

As a nonlimiting example, Vendor X has been involved in the selling of widgets by mail order for many years. Vendor X currently has its own systems in place to process orders submitted by mail or by phone and has several fulfillment centers, but Vendor X wants to add online ordering. With the system described herein, Vendor X may be able to provision and configure a channel application 117 on the one or more servers 103 in a self-service manner to enable online ordering. To complete the provisioning, Vendor X may need to provide data such as products and inventory data, and/or associate configuration parameters to enable the channel application 117 to interface with the existing systems of Vendor X, such as payment processing systems, fulfillment systems, etc.

As another nonlimiting example, Vendor Y has operated a chain of brick-and-mortar discount stores for several decades. Vendor Y has previously provisioned channel applications 117 enabling online ordering and fulfillment, but Vendor Y now wants to add in-store kiosk ordering capability. With the system described herein, Vendor Y may be able to provision and configure a channel application 117 to enable in-store kiosk ordering in a self-service manner. To complete the provisioning, the system may associate configuration parameters and other data previously provided by Vendor Y with the new channel application 117. Also, the system may request additional data and configuration parameters from Vendor Y, such as display settings for the kiosk screens, etc. After the provisioning, a customer of Vendor Y may be able, for example, to select and pay for products through the use of an online ordering channel application 117 and a respective channel client 112, and then return the products through the use of an in-store kiosk channel application 117 and a respective channel client 112.

As yet another nonlimiting example, Vendor Z is involved with selling digital products and has no physical store or warehouse presence. Vendor Z sells computer software to be fulfilled by Internet download. Previously, Vendor Z has provisioned channel applications 117 to enable online ordering and online fulfillment. Now, Vendor Z wants to add telephone-based ordering and telephone-based customer service. To provision channel applications 117 enabling these channels in a self-service manner, Vendor Z may need to provide configuration parameters and other data to customize how telephone agents relate to its customers, wait/hold times, call center hours and availability, etc. The system may be able to load configuration parameters and other data stored in connection with provisioning online ordering and online fulfillment to complete provisioning of the new channel applications 117.

The one or more merchant clients 106 may be employed within the networked environment 100 to generate a provisioning request for a channel application 117 to be sent to the one or more servers 103. Such a provisioning request may be, for example, to create, modify, or remove provisioning of an instance of a channel application 117 associated with a merchant in a self-service manner. Specifically, a merchant, such as Vendor Z in the above example, may want to add order by telephone capability. Later, Vendor Z may want to change a script for a phone agent associated with an existing order by telephone channel, remove an order by telephone channel, or complete some other provisioning action. The provisioning request may be expressed, for example, through XML or other language.

According to one embodiment, a merchant may be required to log in to the system first through the one or more merchant clients 106. This log-in process may, for example, include the merchant providing a username, a password, and/or another security credential. Alternatively, the merchant may be a new user and may be able to provision a channel before supplying security credentials to the system. Once the merchant is authenticated, for example, by the one or more servers 103 examining user privileges data, the one or more merchant clients 106 may display to the merchant channel configuration options, for example, to be selected in configuring a provisioning request. These options may depend on privileges associated with the merchant or the characteristics of a channel of commerce. For example, an online storefront may allow a store name, store logo, color scheme, style sheet, and/or other settings to be configured. Also, these options may be provided to the one or more merchant clients 106 by the one or more servers 103 based on data stored on the one or more servers 103.

An administrator may be associated with the one or more administrator clients 109. The administrator may be responsible for maintaining the one or more servers 103 and may be responsible for configuring initial settings, supervising the system, managing channel applications, creating, modifying, or removing user accounts, and/or allocating resources on the one or more servers 103, etc.

The one or more administrator clients 109 may be used to generate a system configuration request sent to the one or more servers 103. Such a system configuration request may, for example, include a request to set up an account for a new merchant, to set a username, password, and/or another security credential for a merchant, set privileges for a merchant, remove an account of a merchant, configure channel applications 117, and other requests. The system configuration request may be expressed, for example, through XML or other language.

According to one embodiment, one merchant may be capable of configuring a channel application 117 for a telephone ordering system, while another merchant may be capable of configuring a channel application 117 for an in-store kiosk ordering system, etc. According to another embodiment, a merchant may be capable of configuring channel applications 117 for both a telephone ordering system and an in-store kiosk ordering system. In one embodiment, such capabilities may depend on the privileges associated with each merchant and stored on the one or more servers 103, while, in another embodiment, all merchants are capable of provisioning any channel application 117. Alternatively, the one or more servers 103 may be configured to receive system configuration requests from the one or more merchant clients 106 also, for example, in order to allow a merchant to establish a new account.

System configuration requests may also include provisioning resources on the one or more servers 103 for instances of a particular channel application 117 and/or managing channel applications 117 and resources on the one or more servers 103. An administrator using the one or more administrator clients 109 may be required to provide log-in data, such as a username, password, and/or another security credential. Thus, the one or more servers 103 may be configured to authenticate the one or more administrator clients 109 before the one or more administrator clients 109 may be able to send a system configuration request. Authentication may involve the one or more servers 103 comparing the username, password, and/or another security credential against data stored on the one or more servers 103.

According to one embodiment, the one or more servers 103 may include one or more channel applications 117, a provisioning application 118, and a data store 124. The channel applications 117, provisioning application 118, and data store 124 may be included on the same server 103 or distributed across multiple servers 103. As a nonlimiting example, the channel applications 117, provisioning application 118, and data store 124 may each be on separate servers 103. Further, instances of the channel applications 117, provisioning application 118, and data store 124 may each be executed by the same or different servers 103.

The provisioning application 118 may be structured to receive provisioning requests from the one or more merchant clients 106 and/or system configuration requests from the one or more administrator clients 109 over the networks 115. The provisioning application 118 may be in communication with the one or more channel applications 117 and the data store 124. The provisioning application 118, the one or more channel applications 117, and the data store 124 may be on the same server 103 or may reside on different servers 103 in data communication with each other. The one or more channel applications 117 may be in data communication over the networks 115 with one or more channel clients 112. The provisioning application 118 and the one or more channel applications 117 may incorporate, for example, web server applications or like applications.

In one embodiment, the provisioning application 118 may be structured to include a provisioning gateway process 127, a message queue 130, a plurality of provisioning processes 133a-133N, and/or a workflow execution application 136. The workflow execution application 136 may further include a plurality of workflow definitions 139a-139N. The data store 124 may include, but not is limited to, user privileges data 142, merchant data 145, and/or channel configuration data 148. The user privileges data 142, the merchant data 145, and/or the channel configuration data 148 may be, for example, within the same data store 124 or multiple data stores distributed across a network 115 as can be appreciated.

Examples of the user privileges data 142 may include security credentials such as usernames and passwords, a mapping of users to provisioning functions based on privileges, and any other user-related data as can be appreciated. Examples of merchant data 145 may include order data, customer data, payment instrument data, inventory data, and any other merchant-related data as can be appreciated. The merchant data 145 may be accessible for a plurality of channel applications 117 configured for a merchant, thereby allowing selections, customers, and orders to be combined across the plurality of channel applications 117. Examples of channel configuration data may include, for example, configuration settings for any particular channel applications 117 or combinations of channel applications 117. Such configuration settings may configure display settings such as how the channel application 117 is presented to the user, functional settings such as how the inventory of the merchant relates to a particular fulfillment network, and any other settings and/or categories of settings.

According to an embodiment, the provisioning gateway process 127 may be configured to receive provisioning requests from the one or more merchant clients 106 and/or system configuration requests from the one or more administrator clients 109. The provisioning gateway process 127 may be configured to communicate with the one or more merchant clients 106 and/or the one or more administrator clients 109 over a data communications network such as network 115. Alternatively, separate processes may be configured to receive provisioning requests from the one or more merchant clients 106 and system configuration requests from the one or more administrator clients 109.

The provisioning gateway process 127 may be configured to identify and authenticate users, such as merchants, administrators, etc. For example, the provisioning gateway process 127 may be configured to verify the username and/or password that may be provided by the one or more merchant clients 106 and/or the one or more administrator clients 109. Such an authentication step may include retrieving, for example, user privileges data 142, including, for example, usernames, passwords, and/or other security credentials from the data store 124. In some embodiments, merchants may be able to configure a new account with the system, in which case the merchants may not initially have security credentials stored in user privileges data 142. Thus, in some cases, a merchant may proceed with provisioning while security credentials are being established.

The provisioning gateway process 127 may be configured to pass the provisioning request and/or the system configuration request to the message queue 130. Alternatively, the provisioning gateway process 127 may be configured to pass the provisioning request and/or the system configuration request to the workflow execution application 136 directly.

The provisioning gateway process 127 may also be configured to report the results of a provisioning request and/or a system configuration request to the one or more merchant clients 106 and/or the one or more administrator clients 109. Such feedback may include notification of a successful performance of a provisioning request and/or system configuration request, or the failure of such requests. The provisioning gateway process 127 may be configured to retrieve existing channel configuration data 148 from the data store 124 and send data indicating options and the like to the one or more merchant clients 106 to be used by the merchant in preparing a provisioning request.

The plurality of provisioning processes 133a-133N may be configured to read provisioning requests and/or system configuration requests from the message queue 130. Each provisioning process 133 may be configured to perform some portion of the task of provisioning a channel application 117 and may be configured to perform any of the work described in connection with the provisioning gateway process 127 above. One of the provisioning processes 133 may be configured to pass a request directly to the workflow execution application 136 for further processing. Alternatively, another provisioning process 133 may be configured to gather data from the data store 124 to be used in the provisioning. As can be appreciated, the plurality of provisioning processes 133*a*-133N may be configured to do some or all of the provisioning work in the provisioning application 118. The plurality of provisioning processes 133 may be executing on the same or different servers of the one or more servers 103.

In one embodiment, the workflow execution application 136 is used to perform the provisioning work within the provisioning application 118. The workflow execution application 136 may be configured to read the plurality of workflow definitions 139 into memory and execute workflows based upon those definitions. The workflow definitions 139 may be written in any workflow process definition language, such as XML process definition language (XPDL), business process execution language (BPEL), etc. These workflow definitions 139 may be, for example, stored within the data store 124, or some other location. In one embodiment, one of the workflow definitions 139 is written in XML or another language.

Different logical workflows, as defined by the workflow definitions 139, may be used to perform the provisioning work. The work to be done in provisioning may, for example, include provisioning a new channel application 117 for a merchant, modifying an existing channel application 117 for a merchant, reconfiguring a channel application 117 for a merchant, removing a channel application 117 for a merchant, or another action. In performing the provisioning work, the provisioning processes 133 and/or the workflows defined by the workflow definitions 139 may use channel configuration data provided by the one or more merchant clients 106, the channel configuration data 148 retrieved from the data store 124, or both.

If a request is received to provision a new channel application 117 for a merchant or modify an existing channel application 117 for a merchant, a workflow may for example determine whether resources need to be allocated for a particular channel. This may include, for example, provisioning resources on the one or more servers 103 for a particular channel application 117 by allocating memory, storage space, processor time, etc., on the one or more servers 103 for a particular merchant. Resources may also include configuration parameters representing resources exterior to the system such as human resources within a telephone call center, space available in a shipping warehouse, or other resources as can be appreciated. Thus, in some embodiments, the provisioning work involves manual tasks that are triggered by a provisioning process 133 and/or a workflow definition 139. Thus, in some embodiments, the provisioning work is partly or fully automated.

Provisioning may include saving channel configuration data 148 and other data supplied by the merchant to the data store 124. Provisioning may also include such steps as creating, modifying, or removing user accounts associated with the particular channel application 117. After provisioning, the channel application 117 may, in various embodiments, automatically become operable to facilitate a customer interaction for the merchant through the channel of commerce associated with the channel application 117.

If a request is received to modify an existing channel application 117, the work involved in performing that request may involve releasing unused resources or de-allocating memory provisioned for a merchant. Further, requests to create, modify, or otherwise reconfigure a channel application 117 for a merchant may involve updating channel configuration data 148 and/or merchant data 145 in the data store 124. If a request is received to remove provisioning for a channel application 117 for a merchant, then the work involved may include, for example, releasing resources that have been provisioned for the merchant, which may include memory and/or other resources on the one or more servers 103.

In addition, the work performed in removing provisioning of a channel application 117 for a merchant may involve discarding data stored in the data store 124, including, for example, the channel configuration data 148 relating to the particular merchant. Further, if the merchant has any outstanding orders in merchant data 145, removing provisioning may involve gracefully handling the outstanding orders, including allowing the orders to be shipped, and/or any other tasks involved in gracefully terminating customer interactions. The work involved in performing these steps may result in a successful performance of the steps or a failure or some other type of error as can be appreciated. This result may be reported back to the one or more merchant clients 106 by sending the result back to the message queue 130 via one of the provisioning processes 133, by reporting the result directly to the provisioning gateway process 127, or by some other method as can be appreciated.

The work associated with a system configuration request may be performed in a like manner though the same processes and applications or different applications as can be appreciated. If a system configuration request to create, modify, or remove an account of a merchant is received, the provisioning application 118 may operate on data in the data store 124. Likewise, if the request pertains to configuring the one or more channel applications 117, the provisioning application 118 may operate on data in the data store 124 and may also communicate with, and configure, the one or more channel applications 117 directly.

Multiple provisioning and system configuration requests may be received, and they may be processed serially or in parallel. Moreover, a single communication from a client may embody multiple provisioning and/or system configuration requests. Thus, a merchant client 106 may, for example, send a request to provision a plurality of channel applications 117 at one time.

The one or more channel applications 117 may be executing on one or a combination of the one or more servers 103. Each instance of a channel application 117 is associated with a particular channel of commerce and is designed to facilitate customer interaction for a merchant. Alternatively, an instance of a channel application 117 may be associated with a multiple-merchant marketplace, where one or more merchants offer products or services alongside one another. According to various embodiments, several different channels of commerce are contemplated herein. Examples of different channels of commerce include, but are not limited to, an online store, a brick-and-mortar store, a kiosk or computer system within a physical store, a telephone order system, a telephone-based customer service system, a mobile computing platform, a television set-top-box, and/or other channels. In some embodiments, the channel applications 117 may be associated only with order channels, which are channels of commerce related to the ordering process.

Specifically, one channel of commerce involves, for example, a direct order configuration in which a user of the channel client 112 manipulates the channel client 112 to interact with a channel application 117 on the one or more servers 103 in order to generate an order for a product that is sold, for example, by an online merchant that operates the channel application 117. Such a channel of commerce involves the channel client 112, the channel application 117, and materials handling facilities such as fulfillment centers that facilitate the generation of transactions and the fulfillment of such transactions. Fulfillment of an order generally involves, for example, achieving shipment of a product to a desired destination address, and other tasks.

In another example, a channel of commerce may involve orders generated by telephone. In such a case, a call center may be employed that includes telephone operators who take orders for items over the telephone. Such operators may then place an order using the channel client 112 that interfaces with the channel application 117 through the networks 115. Specifically, customers call operators within the call center who then take orders for products to be purchased by the customers over the telephone. The operators then manipulate the channel clients 112 in order to interface with the channel application 117 to input an order for one or more products as can be appreciated. This channel of commerce is similar to a direct order configuration except the telephone operator acts as a middleman to generate an order, where fulfillment is similar to the fulfillment for the direct order configuration described above.

The one or more channel applications 117 may be configured to read from the data store 124 the user privileges data 142, the merchant data 145, the channel configuration data 148, and/or other data as needed. In addition to security credentials for a merchant, the user privileges data 142 may include security credentials for particular merchant employees or groups of merchant employees. The user privileges data 142 may also define what particular configurations of the one or more channel applications 117 may be made by a particular merchant. The merchant data 145 may include inventory data, pricing data, order data, shipping data, customer data, and/or any other type of data generally associated with a merchant. The channel configuration data 148 may include display settings, such as logos and other images associated with the merchant, color schemes, layout preferences, etc. Some display settings may be expressed through one or more style sheets or other means.

The channel configuration data 148 may also include functional settings and other settings as can be appreciated. Examples of functional settings may include, but are not limited to, number of call agents assigned to a channel application 117 associated with an order by phone channel of commerce, a script for a phone agent to use in handling a particular customer interaction, which currency is to be used, which customer authentication questions are to be used, which system is to be used for fulfillment of orders, etc.

The one or more channel applications 117 may also be configured to update the data stored in the data store 124, including, for example, the user privileges data 142, the merchant data 145, and/or the channel configuration data 148. Depending upon what settings are stored in the merchant data 145 and the channel configuration data 148, the behavior of one of the channel applications 117 may be customized for a particular merchant when a customer interacts with the merchant through a channel of commerce as in, for example, completing a sale. If an agent is involved in the customer interaction, the merchant data 145 and/or the channel configuration data 148 may also have configured the task of assigning the agent to the customer though the channel application 117 and the channel client 112.

Data relating to a customer interaction is generated in the one or more channel clients 112. Each channel client 112 may in some cases be associated with the same channel of commerce as a particular channel application 117. For example, a channel client 112 may provide a telephone-ordering user interface, while a corresponding channel application 117 may provide the back-end functionality needed to record the telephone order, arrange for payment, generate a shipping manifest at a fulfillment center, etc. The data generation task may involve a customer entering data in a channel client 112 or an agent entering data on behalf of the customer in the channel client 112. The manner in which data entry occurs depends on the nature of the channel of commerce.

This data relating to a customer interaction is sent over the networks 115 to the one or more channel applications 117 for processing. This processing may, for example, involve retrieving data from the data store 124. After the processing is complete in the one or more channel applications 117, the result of the processing may be reported back to the one or more channel clients 112 via the networks 115. The one or more channel clients 112 then may be configured to display the result to the customer or the agent, thus completing the customer interaction.

The interaction described above may be repeated multiple times where the channel client 112 communicates with the one or more channel applications 117. Moreover, there may be additional communication between the channel client 112 and the one or more channel applications 117 during the interaction in order to, for example, gather additional user input, provide feedback, etc.

Figure 2:
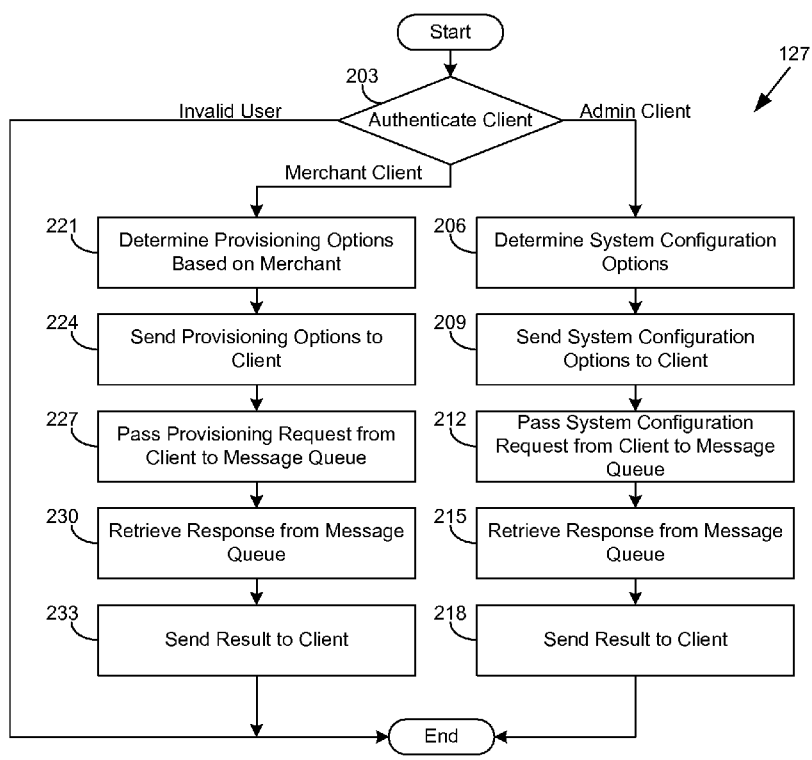
FIG. 2 is a flowchart that provides one example of functionality for a provisioning gateway process employed in the networked environment of FIG. 1 according to an embodiment of the present disclosure.

With reference to FIG. 2, shown is a flowchart that provides one example of the operation of the provisioning gateway process 127 (FIG. 1) according to various embodiments. It is understood that the flowchart of FIG. 2 provides merely an example of the many different types of functional arrangements that may be employed to implement the operation of the provisioning gateway process 127 as described herein. As an alternative, the flowchart of FIG. 2 may be viewed as depicting an example of steps of a method implemented in the one or more servers 103 (FIG. 1) according to one or more embodiments.

To begin, in box 203, the provisioning gateway process 127 authenticates a client, for example, as either a merchant client 106 (FIG. 1) or an administrator client 109 (FIG. 1). The provisioning gateway process 127 may receive, for example, a username, password, and/or any other security credential that may be used to authenticate. If the provisioning gateway process 127 determines that the security credentials supplied represent an invalid user, then the provisioning gateway process 127 performs no work and terminates in this embodiment. Alternatively, the provisioning gateway process 127 may report back an error to the client. In some embodiments, a merchant client 106 may not need to be first authenticated if the merchant client 106 is a new user.

If the provisioning gateway process 127 determines that the client is an administrator client 109, then, in box 206, the provisioning gateway process 127 may then determine system configuration options. This may involve communicating with the data store 124 (FIG. 1) to retrieve data from, for example, the user privileges data 142 (FIG. 1), the merchant data 145 (FIG. 1), and/or the channel configuration data 148 (FIG. 1). Next, in box 209, the provisioning gateway process 127 sends the system configuration options to the administrator client 109. Such options may include the allocation of storage space on the one or more servers 103 to a particular channel application 117, input fields to configure a new merchant, supervisory tasks, etc. At this point, the provisioning gateway process 127 may then wait for input from the administrator client 109. This input may include a system configuration request. In box 212, if a system configuration request is received from the administrator client 109, the provisioning gateway process 127 passes the system configuration request from the administrator client 109 to the message queue 130 (FIG. 1).

Next, the work associated with the system configuration request is performed. In this embodiment, such work is performed by the provisioning processes 133 (FIG. 1) and the workflow execution application 136 (FIG. 1). In an alternative embodiment, a workflow execution application 136 may perform all the work. Such work may involve the tasks of generating instances of channel applications 117, creating user accounts within the data store 124, updating settings and other data within the data store 124, etc.

Next, in box 215, the provisioning gateway process 127 retrieves a response from the message queue 130. This response may comprise feedback relating to the performance of the system configuration request. Finally, in box 218, the result is sent to the administrator client 109. This result may comprise, for example, feedback as to whether the system configuration request was performed successfully. At this point, the provisioning gateway process 127 may end. The use of the message queue 130 illustrates an embodiment using asynchronous processing. Alternatively, synchronous processing may be used to perform the configuration work, in which case, the provisioning gateway process 127 may communicate with the provisioning process 133 and/or workflow execution application 136 directly.

In box 203, if the provisioning gateway process 127 determines that the client is a merchant client 106, then in box 221, the provisioning gateway process 127 determines the provisioning options to offer to the merchant client 106 based on the particular merchant. This task may involve, for example, retrieving data from the data store 124, including, for example, the user privileges data 142, the merchant data 145, and/or the channel configuration data 148. Based on stored privileges, one merchant may be able to provision an online store, while another merchant may be able to provision an online store and an in-store kiosk; other combinations and settings may be permitted. In some embodiments, all provisioning options are available to all merchants. Next, the provisioning gateway process 127 sends the provisioning options to the merchant client 106 in box 224. The merchant client 106 may then allow the merchant user to select provisioning options to form a provisioning request. The merchant client 106 then sends the provisioning request incorporating the selected provisioning options to the provisioning gateway process 127.

In box 227, the provisioning gateway process 127 passes the provisioning request that it has received from the merchant client 106 to the message queue 130. Alternatively, the provisioning gateway process 127 may be configured to initiate performance of the work associated with the provisioning request with the workflow execution application 136 directly. In box 230, after the provisioning has been performed, the provisioning gateway process 127 then retrieves a response from the message queue 130. This response may represent the result of the work performed in processing the provisioning request.

Finally, in box 233, the provisioning gateway process 127 sends the result of the provisioning request back to the merchant client 106. Such a result may indicate success or failure or another result as can be appreciated. Then, the provisioning gateway process 127 ends. The use of the message queue 130 illustrates an embodiment using asynchronous processing. Alternatively, synchronous processing may be used to perform the configuration work, in which case the provisioning gateway process 127 may communicate with the provisioning process 133 and/or workflow execution application 136 directly.

Figure 3:
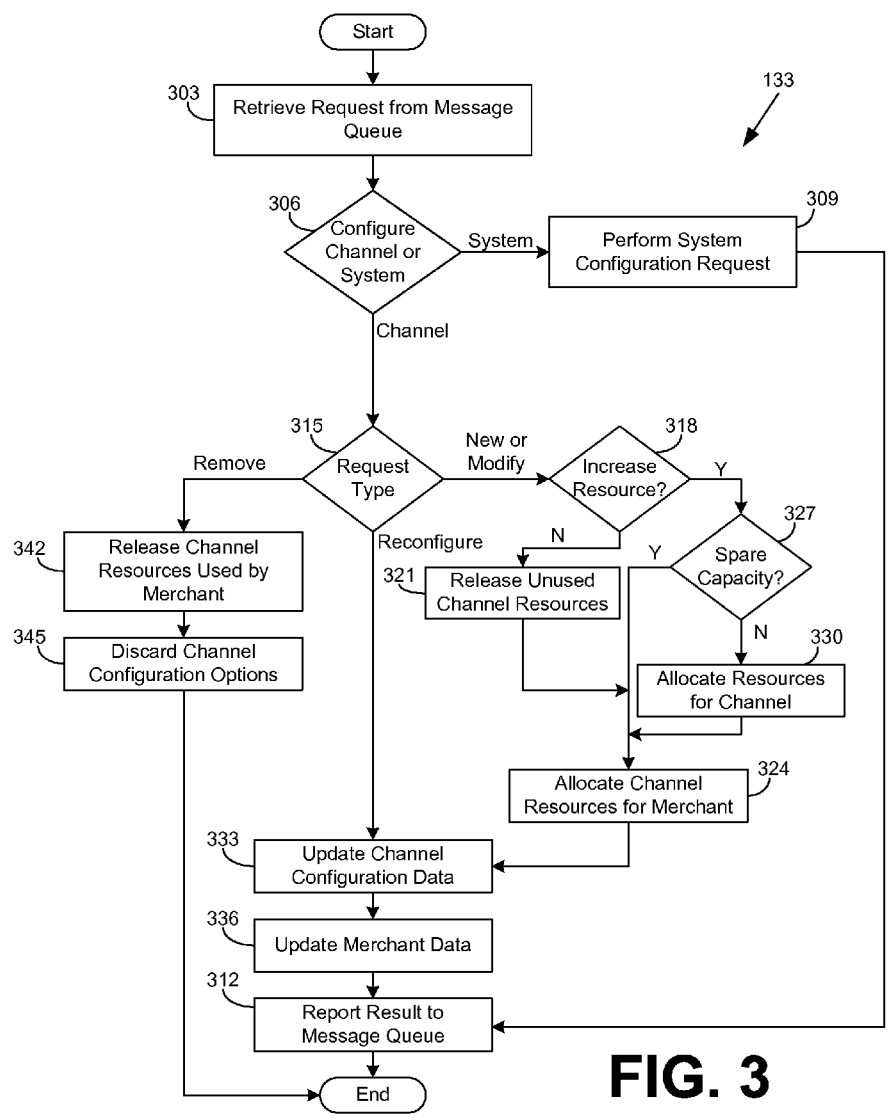
FIG. 3 is a flowchart that provides one example of functionality of a provisioning process employed in the networked environment of FIG. 1 according to an embodiment of the present disclosure.

Turning now to FIG. 3, shown is a flowchart that provides one example of the operation of the provisioning process 133 according to various embodiments. It is understood that the flowchart of FIG. 3 merely provides an example of the many different types of functional arrangements that may be employed to implement the operation of the provisioning process 133 as described herein. As an alternative, the flowchart of FIG. 3 may be viewed as depicting an example of steps of a method implemented in the one or more servers 103 (FIG. 1) according to one or more embodiments.

To begin, in box 303, the provisioning process 133 (FIG. 1) retrieves a request from the message queue 130 (FIG. 1). This is an example of asynchronous request processing. Alternatively, the request may be processed synchronously, with the work shown in FIG. 3 initiated directly by a provisioning gateway process 127 (FIG. 1) as depicted in FIG. 2. Next, in box 306, the provisioning process 133 determines whether the request is to configure the system or to configure a channel application 117. If the request is a system configuration request, then the provisioning process 133 performs the system configuration request in box 309. This may involve communicating with the workflow execution application 136 (FIG. 1) to begin executing a workflow definition 139 (FIG. 1).

System configuration requests may include, but are not limited to, requests to establish a new account or modify an existing account of a merchant, including log-in settings, requests to partition, allocate, organize, and/or otherwise modify memory or storage space on the one or more servers 103, requests to allocate processor time on the one or more servers 103, requests to allocate or otherwise modify resources on the one or more servers 103 for a particular channel application 117 (FIG. 1) or group of channel applications 117, etc. After the system configuration request is performed, a result may be obtained. In box 312, the provisioning process 133 reports such a result to the message queue 130. Alternatively, the result could be reported directly to the provisioning gateway process 127. This result may indicate success or failure or some other result as can be appreciated. The provisioning process 133 then ends.

If the provisioning process 133 determines, in box 306, that the request received from the message queue 130 represents a channel configuration request, then the provisioning process 133 proceeds to box 315, where the provisioning process 133 determines the type of provisioning request. The provisioning request may be to create a new instance of a channel application 117 for the merchant, modify provisioning of an existing instance of a channel application 117 for this merchant, reconfigure an existing instance of a channel application 117, or remove an instance of a channel application 117. It is understood that a channel application 117 provisioned for a particular merchant is an instance of that channel application 117. Fulfilling the provisioning request may involve instantiating one or more channel applications 117 into memory or merely creating or updating configurations so that one or more channel applications 117 may be instantiated at a future time.

If the provisioning process 133 determines that the provisioning request is to provision a new channel application 117 for a merchant or modify an existing channel application 117 for a merchant, the provisioning process 133 proceeds to box 318, where it determines whether an increase in resources on the one or more servers 103 is needed as a result of the provisioning request. Such resources may include processor time, memory, storage space, and/or other computing resources required to accommodate instances of the channel application 117. If the provisioning process 133 determines that the provisioning request will not result in an increase in resources, then the provisioning process 133 may proceed to release unused resources associated with that channel and that merchant in box 321. Such a task may be performed if, for example, a request to modify an existing channel actually frees up existing resources.

Afterwards, the provisioning process 133 proceeds to box 324 and allocates channel resources to the particular merchant in accordance with the provisioning request. Alternatively, such a check of available resources may be skipped, and the process may in that case proceed directly to provisioning. For example, a check of available resources may be unnecessary if the system is preconfigured with ample resources.

If, on the other hand, the provisioning process 133 determines, in box 318, that an increase in resources is necessary as a result of the provisioning request, the provisioning process 133 then proceeds to box 327, where it determines whether the system has spare capacity. Such a determination may be based on the amount of available memory in the one or more servers 103 or some other measurement as can be appreciated. If there is spare capacity to accommodate this provisioning request, then the provisioning process 133 proceeds to box 324 and allocates the channel application 117 resources for the merchant. If there is no spare capacity in the system to accommodate this provisioning request, the provisioning process 133 proceeds to box 330, where the provisioning process 133 then allocates resources in the system for the particular channel application 117 to accommodate this provisioning request. This may include reserving memory or other resources on the one or more servers 103 to accommodate the request. Then the provisioning process 133 proceeds to box 324 and allocates the channel resources for the merchant in accordance with the provisioning request.

Next, the provisioning process 133 proceeds to box 333 where it may update the channel configuration data 148 (FIG. 1) in the data store 124 (FIG. 1) in accordance with the provisioning request. Examples of the channel configuration data 148 may include, but are not limited to, fulfillment network parameters, client display settings, style sheets, graphics, images, telephone agent scripts, etc. This task may further involve retrieving some of the merchant data 145, some of the channel configuration data 148, and/or some of any other data stored in the data store 124, and using the retrieved data to determine how the particular channel application 117 will be provisioned and configured for this merchant. Some of the retrieved data may have been provided previously by the merchant in conjunction with configuring this or other channel applications 117.

Thus, the data provided by the merchant may be modified in some way before being updated. For example, the provisioning request may contain data specifying a certain font family to be used for an in-store kiosk display. The provisioning process 133 may retrieve stored settings, such as a logo, currently in the data store 124 in order to configure settings for the new channel applications 117. Further examples using new data combined with stored data can be appreciated.

Additionally, if a merchant is provisioning a new channel application 117, stored channel configuration data 148 and/or other data previously provided by the merchant may be loaded into memory. This may have the effect of reducing the number of settings the merchant has to provide for the new application. Thus, if a merchant previously uploaded its inventory for a first channel application 117, the merchant may not have to re-upload the same data to provision a second channel application 117. Also, such stored data may be reused when a merchant reconfigures an existing channel application 117, with similar advantages as can be appreciated.

Then, in box 336, the provisioning process 133 may update the merchant data 145 (FIG. 1). Examples of the merchant data 145 may include, but are not limited to, inventory data, order data, customer data, etc. In like manner as box 333, updating the merchant data 145 may involve retrieving stored data from the data store 124 and using the stored data to complete the provisioning task. Some of these tasks performed in FIG. 3 may have a result of success, failure, or some other result as can be appreciated. In box 312, this result may be reported back to the message queue 130. Alternatively, the result could be reported directly to the provisioning gateway process 127. The provisioning process 133 then ends.

If, in box 315, the provisioning process 133 determines that the type of provisioning request is to reconfigure an existing channel for a merchant, then the provisioning process 133 proceeds to box 333 where it may update the channel configuration data 148. Next, the provisioning process 133 may update the merchant data 145 in box 336. Finally, these tasks may have a result of success, failure, or some other result as can be appreciated. In box 339, this result is reported to the message queue 130. In an alternative embodiment using synchronous processing, this result may be reported directly to the merchant client 106 by the provisioning gateway process 127, for example. Then the provisioning process 133 ends.

If, in box 315, the provisioning process 133 determines that the provisioning request is to remove an already provisioned channel, then the provisioning process 133 then releases channel resources that had been used by the merchant in box 342. Then, in box 345, the provisioning process 133 may then discard channel configuration options that are no longer needed. This task may involve communicating with the data store 124 to update the channel configuration data 148, for example. Then the provisioning process 133 terminates.

In an alternative embodiment, the tasks depicted in FIG. 3 may be performed by the workflow execution application 136. Further, any of the tasks or any combination of the tasks depicted in FIG. 3 may be defined in a workflow definition 139.

Figure 4:
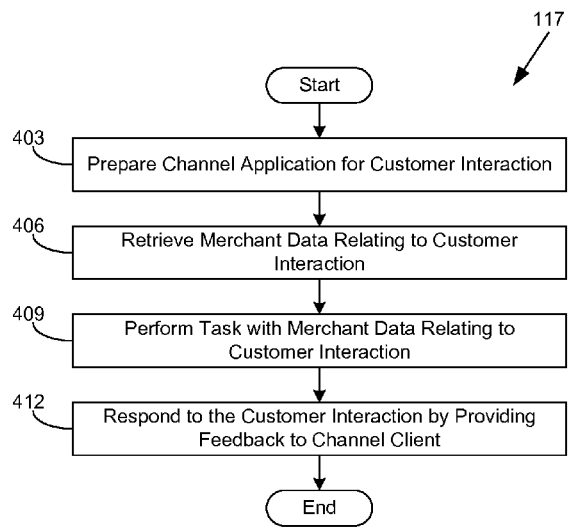
FIG. 4 is a flowchart that provides one example of functionality of a channel application employed in the networked environment of FIG. 1 according to an embodiment of the present disclosure.

Referring now to FIG. 4, shown as a flowchart that provides one example of the operation of the one or more channel applications 117 (FIG. 1) according to various embodiments. It is understood that the flowchart of FIG. 4 merely provides an example of the many different types of functional arrangements that may be employed to implement the operation of the channel application 117 as described herein. As an alternative, the flowchart of FIG. 4 may be viewed as depicting an example of steps of a method implemented in the one or more servers 103 (FIG. 1) according in one or more embodiments.

To begin, the channel application 117 is prepared for the customer interaction in box 403. This task may involve accessing merchant data 145 (FIG. 1), channel configuration data 148 (FIG. 1), and/or or other data from the data store 124 in order to present an interface to a user of a channel client 112 (FIG. 1). The user may be a customer and the interface may be an online storefront, in which case data relating to customized display settings may be retrieved. In another case, the user may be a telephone agent in a telephone call center and the interface may be a computer screen allowing the agent to look up customer information for a merchant. In yet another case, the user may be a worker in a shipping warehouse and the interface may serve to generate shipping manifests for a merchant. Other examples of users and interfaces may be appreciated.

Next, data relating to a customer interaction is sent from the channel client 112 via the networks 115 to the channel application 117 and, in box 406, the channel application 117 retrieves merchant data 145 relating to that customer interaction. This may involve, for example, accessing the merchant data 145 in the data store 124. For example, a customer interaction may comprise querying the status of an order to see whether it has shipped. In such a case, the channel application 117 may retrieve merchant data 145 including data describing the particular order. Other customer interactions may be appreciated.

Next, in box 409, the channel application 117 performs a task with the merchant data 145 that has been retrieved relating to the customer interaction. This task may be performed relative to the channel configuration data 148 (FIG. 1) associated with the channel application 117 and stored in the data store 124. The task may be performed by the channel application 117 on the one or more servers 103 or it may be performed, for example, by an application executing on another server. The task may be performed, for example, by a workflow execution application 136 on the one or more servers 103 or some other server. The task may also involve additional communication with and/or input from the customer and/or the agent as can be appreciated.

With the example of a customer querying the status of his or her order, this task may involve communicating with a remote computer system to determine the status of a shipment with a delivery entity. Other tasks relating to performing a customer interaction may be appreciated.

Next, in box 412, the channel application 117 may then respond to the customer interaction by providing some type of feedback to the channel client 112. The task performed in box 409 may have a result such as success, failure, or some other kind of result, and the channel application 117 may provide this result back to the channel client 112 in the form of feedback. In the example of a customer querying the status of his or her order, here the status may be reported back to the customer stating that the shipment is, for example, in transit and is scheduled to be delivered on a certain day. Other types of feedback may be appreciated. The channel application 117 then ends. The process depicted in FIG. 4 may be repeated any number of times in order to achieve, for example, a desired result for a customer.

Figure 5:
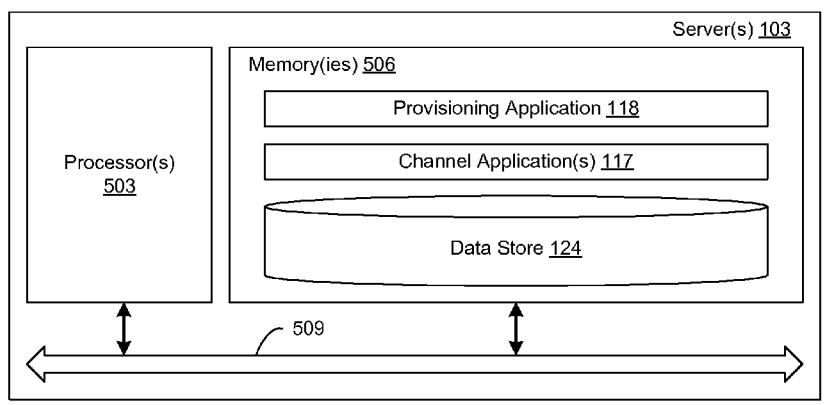
FIG. 5 is a schematic block diagram that illustrates one example of a server employed in the networked environment of FIG. 1 according to an embodiment of the present disclosure.

Referring next to FIG. 5, shown is a schematic block diagram of one example of a server 103 (FIG. 1) according to an embodiment of the present disclosure. The server 103 includes a processor circuit, for example, having a processor 503 and a memory 506, both of which are coupled to a local interface 509. To this end, the server 103 may comprise, for example, a server computer with such a structure. The local interface 509 may comprise, for example, a data bus with an accompanying address/control bus or other bus structure as can be appreciated.

Stored in the memory 506 are both executable components and data. In particular, stored in the memory 506 and executable by the processor 503 are the provisioning application 118 (FIG. 1), the one or more channel applications 117 (FIG. 1), and potentially other applications. Also stored in the memory 506 are the data store 124 (FIG. 1) and other data. In addition, a server operating system may be stored in the memory 506 and executable by the processor 503 as can be appreciated.

It is understood that there may be other applications stored in the memory 506 and executable by the processor 503 as can be appreciated. Also, other data may be stored in the memory 506 and accessed by the processor 503 associated with the operation of the provisioning application 118 and the one or more channel applications 117. The provisioning application 118 and the one or more channel applications 117 may be implemented using any one of, or a combination of, a number of programming languages such as, for example, C, C++, C#, Visual Basic, VBScript, Java, JavaScript, Perl, Ruby, Python, Flash, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Although the various components executed on the one or more servers 103 as described above may be embodied in software or code executed by general purpose hardware as discussed above, as an alternative, the same may also be embodied in dedicated hardware or a combination of software/general purpose hardware and dedicated hardware. If embodied in dedicated hardware, the same can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2-4 show the architecture, functionality, and operation of an implementation of portions of the provisioning application 118 and the one or more channel applications 117. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowcharts of FIGS. 2-4 show a specific order of execution, it is understood that the order of execution may differ from that which is depicted. For example, the order of execution of two or more blocks may be scrambled relative to the order shown. Also, two or more blocks shown in succession in FIGS. 2-4 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where the provisioning application 118, the one or more channel applications 117, and/or any other component implemented in the one or more servers 103 comprises software or code, it can be embodied in any computer-readable medium for use by or in connection with an instruction execution system such as, for example, a processor in a computer system or other system. In this sense, the provisioning application 118, the one or more channel applications 117, and/or any other component implemented in the one or more servers 103 may comprise, for example, statements including instructions and declarations that can be fetched from the computer-readable medium and executed by the instruction execution system. In the context of the present invention, a "computer-readable medium" can be any medium that can contain, store, or maintain the software or code for use by or in connection with the instruction execution system. The computer readable medium can comprise any one of many physical media such as, for example, electronic, magnetic, optical, electromagnetic, infrared, or semiconductor media. More specific examples of a suitable computer-readable medium include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising the steps of:
identifying a merchant based on security credentials supplied by a merchant client;
using user privileges data to determine channel configuration options available for the merchant;
providing the channel configuration options available for the merchant to the merchant client;
retrieving stored channel configuration data from at least one server;
implementing a self-service provisioning of a channel application on the at least one server for the merchant based on the stored channel configuration data and channel configuration data supplied by the merchant client, the provisioning being performed automatically, the channel application being associated with a channel of commerce and becoming operable to facilitate a customer interaction for the merchant through the channel of commerce;
saving the channel configuration data supplied by the merchant client to a data store; and
communicating with at least one channel client to perform the customer interaction according to merchant data stored on the at least one server.

2. The method of claim 1, further comprising the step of implementing a self-service provisioning of a next channel application on the at least one server for the merchant based on the stored channel configuration data and additional merchant-provided channel configuration data, at least a portion of the provisioning being performed automatically, the next channel application being associated with a next channel of commerce and becoming operable to facilitate a next customer interaction for the merchant through the next channel of commerce.

3. A method, comprising the steps of:
retrieving stored channel configuration data from a data store;
implementing a self-service provisioning of at least one of a plurality of channel applications on at least one server for a merchant based on the stored channel configuration data and the channel configuration data supplied by a merchant client, at least a portion of the provisioning being performed automatically, each of the channel applications being associated with a channel of commerce and, upon provisioning, becoming operable to facilitate a customer interaction for the merchant through the channel of commerce; and
communicating with at least one channel client to perform the customer interaction according to merchant data stored on the at least one server.

4. The method of claim 3, wherein the implementing step further comprises allocating resources on the at least one server for the channel application and for the merchant.

5. The method of claim 3, further comprising the step of saving the channel configuration data to the data store.

6. The method of claim 3, wherein the implementing step executes a plurality of workflow definitions by a workflow execution application on the at least one server.

7. The method of claim 3, wherein the channel of commerce comprises a telephone order system.

8. The method of claim 3, wherein the channel of commerce comprises a mobile computing platform.

9. The method of claim 3, wherein the channel of commerce comprises an order location in a physical store.

10. The method of claim 9, wherein the order location is a kiosk.

11. The method of claim 9, wherein the order location is a computer system.

12. The method of claim 3, wherein the channel application facilitates ordering.

13. The method of claim 3, wherein the channel application is a multiple merchant marketplace.

14. The method of claim 3, further comprising:
using user privileges data to determine channel configuration options available for the merchant; and
providing the channel configuration options available for the merchant to the merchant client.

15. The method of claim 3, wherein all of the provisioning is performed automatically.

16. A system, comprising:
at least one server;
a data store accessible to the at least one server;
a plurality of channel applications executable on the at least one server, each of the channel applications being associated with a channel of commerce; and
a provisioning application executable on the at least one server, the provisioning application being operable to:
retrieve stored channel configuration data from the data store; and
implement a self-service provisioning of at least one of the channel applications on the at least one server for the merchant based on the stored channel configuration data and channel configuration data supplied by a merchant client, wherein at least a portion of the provisioning is performed automatically;
wherein each of the channel applications, upon provisioning, becomes operable to facilitate a customer interaction for the merchant through the channel of commerce.

17. The system of claim 16, wherein the provisioning application is further operable to allocate resources on the at least one server for the at least one of the channel applications and for the merchant.

18. The system of claim 16, wherein the provisioning application saves the channel configuration data supplied by the merchant client to the data store.

19. The system of claim 16, wherein the provisioning application is further operable to modify provisioning of a pre-existing channel application.

20. The system of claim 16, wherein the provisioning application comprises:
a provisioning gateway process configured to communicate with the merchant client;
a message queue; and
a plurality of provisioning processes, each of the provisioning processes being configured to read requests from and write responses to the message queue.

21. The system of claim 20, wherein the provisioning application further comprises a plurality of workflow definitions executed by a workflow execution application.

22. The system of claim 20, wherein the provisioning gateway process communicates with the merchant client over a data communications network.

23. The system of claim 16 wherein the channel of commerce comprises a telephone order system.

24. The system of claim 16 wherein the channel of commerce comprises a mobile computing platform.

25. The system of claim 16, wherein the channel of commerce comprises an order location in a physical store.

26. The system of claim 25, wherein the order location is a kiosk.

27. The system of claim 25, wherein the order location is a computer system.

28. The system of claim 16, wherein at least one of the channel applications facilitates ordering.

29. The system of claim 16, wherein all of the provisioning is performed automatically.

30. The system of claim 16, wherein at least one of channel applications is a multiple merchant marketplace.

* * * * *